United States Patent [19]

Maier et al.

[11] Patent Number: 4,457,127
[45] Date of Patent: Jul. 3, 1984

[54] MOWER

[75] Inventors: Martin Maier, Gottmadingen; Hermann Ruprect, Singen, both of Fed. Rep. of Germany

[73] Assignee: Klockner-Humboldt-Deutz AG, Gottmadingen, Fed. Rep. of Germany

[21] Appl. No.: 408,019

[22] Filed: Aug. 13, 1982

[30] Foreign Application Priority Data

Aug. 31, 1981 [DE] Fed. Rep. of Germany ....... 3134391

[51] Int. Cl.³ .......................................... A01D 55/18
[52] U.S. Cl. ..................................... 56/192; 56/228; 56/15.2
[58] Field of Search .................. 56/6, 10.4, 192, 15.1, 56/15.2, 15.3, 15.5, 228

[56] References Cited

U.S. PATENT DOCUMENTS

| | | | |
|---|---|---|---|
| 3,070,938 | 1/1963 | Winget | 56/6 |
| 3,757,500 | 9/1973 | Averitt | 56/6 |
| 3,965,658 | 6/1976 | Van der Lely | 56/192 |
| 3,979,889 | 9/1976 | Vansteelant | 56/192 |

Primary Examiner—Gene Mancene
Assistant Examiner—David I. Tarnoff
Attorney, Agent, or Firm—Laurence R. Brown

[57] ABSTRACT

This mower has a mower beam with at least one rotating mowing device joined on the mower beam and also on a carrying beam arranged on the hitching mount, which in the forward movement of the machine is arranged in front of and above the mower beam, whereby the carrying beam is coupled somewhat in the center of the hitching mount behind the tractor about a vertical pivot axis and whereby the carrying beam outboard half from the hitching mount is somewhat in its center provided with a horizontal pivot axis in order to permit the outer part of the carrying beam carrying the mowing device to swing upwardly by means of a hydraulic cylinder.

3 Claims, 6 Drawing Figures

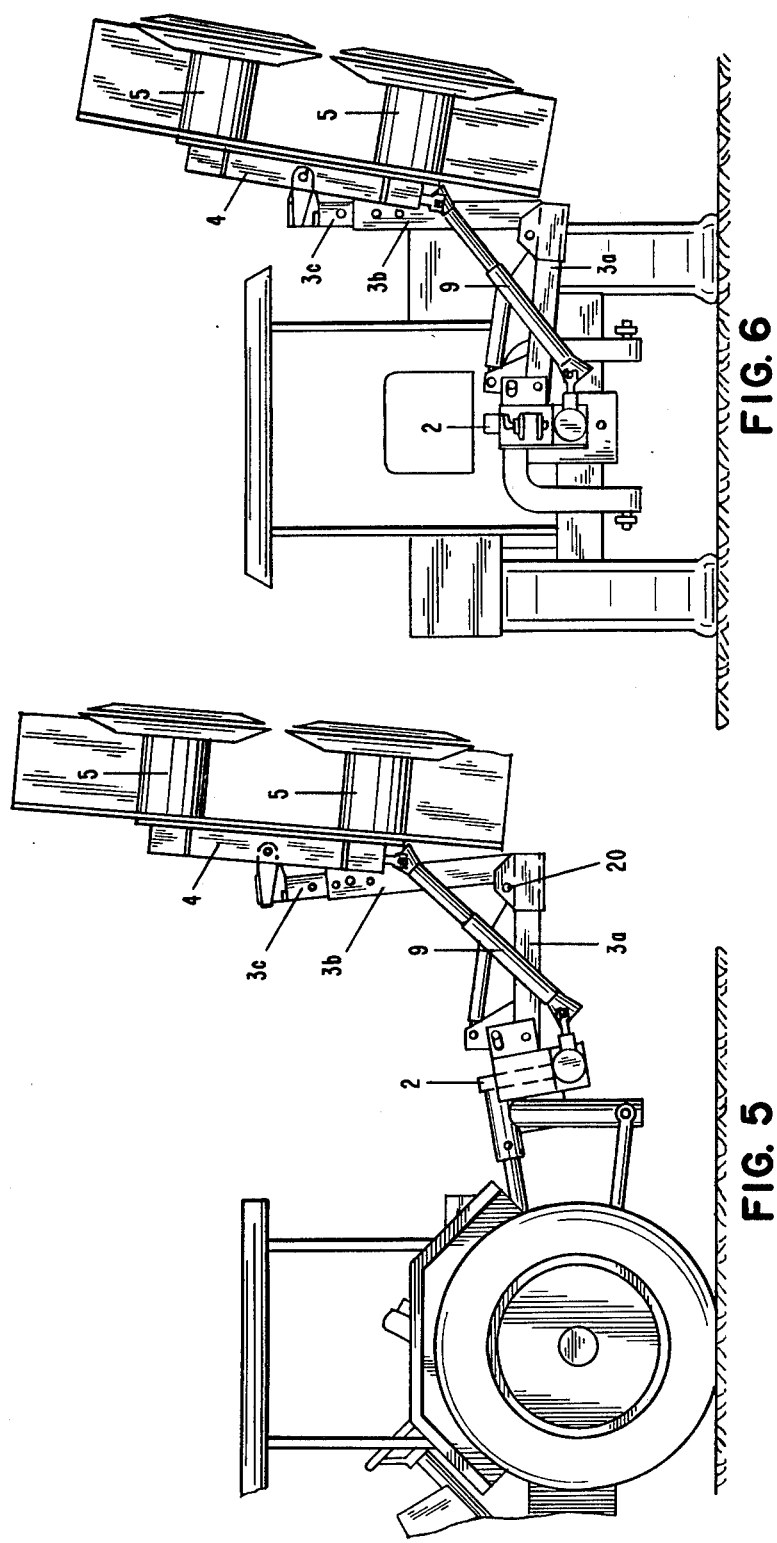

MOWER

Technical Field

This invention relates to a mower with a mower supporting mount beam carrying at least one rotating mower device on its underside and coupled to a carrying beam as well as a hitching mount in such a way that in the forward travel of the mower in its working position the carrying beam is in front of and above the mower supporting mount beam.

Background Art

This type of mower, which is arranged at an angle to the movement of the pulling tractor permits a number of mowing devices to be arranged on a mower supporting mount beam for mowing over a relatively large width. Upon finishing the mowing task, the mower, which substantially extends beyond the width of the tractor, must now be brought into a transport position in order to pass through traffic.

Heretofore a pivotable mower is known, which is coupled on a vertical pivot axis located approximately in the center of the hitching mount of the tractor. In its transport position the mower pivots about this vertical axis to the rear so that it can move along the path of the tractor. To be sure, it no longer extends beyond the largest width of the tractor, but this position nevertheless has the disadvantage that the center of gravity lies far behind the tractor along the transport path. In extreme cases this can lead to the front wheels of the tractor leaving the road, especially on rough roads.

A further mower is known with a vertical pivot axis laterally positioned from the hitching mount so that the mower can pivot about 180° without extending substantially beyond the maximum width of the tractor. This certainly permits the center of gravity to be nearer to the tractor, but introduces the disadvantage that the drive shaft for rotating the mowing device must be disconnected in the transport position.

A further known mower has a horizontal pivot axis laterally removed from the hitching mount, so that the mower in its transport position is drawn in a somewhat perpendicular position overhead. In this way it is also positioned along laterally from the tractor and always extends substantially outwardly.

Disclosure of the Invention

This invention is based upon the principle that a mower which works has a common center of gravity for the tractor and mower close to the tractor for transport, while keeping the drive shaft for the mowing device connected in each position and whereby the allowable transport width is not exceeded.

In order to overcome the disadvantages of the prior art with a mower, a carrying beam is mounted on a hitching mount substantially centrally behind the tractor upon a vertical pivot axis, and the carrying beam extending outwardly from the hitching mount has approximately at its center an outer part pivotable upwardly about a horizontal pivot point to carry therewith the mowing device. The outer part of the carrying beam has a hydraulic cylinder with one end coupled to the hitching mount.

For example, the horizontal pivot axis extends above the carrying beam and at an angle to it from a carrying sleeve surrounding the carrying beam.

In a preferred embodiment, a slidable extension upon which the mowing devices are pivoted is provided on the outer carrying beam part, while in the vicinity of the vertical pivot axis latching means is arranged having a spring and a locking latch member.

The extendible piston of a hydraulic cylinder can be coupled perpendicularly to the outer carrying beam part near the horizontal pivot axis positioned on the sleeve.

Because of the combined arrangement comprising a vertical pivot axis centered at the hitching mount and a horizontal pivot axis outwardly positioned on the carrying beam outside the three point mount there are certain advantages.

Thereby the center of gravity of the mower in transport is nearer to the tractor since it is pulled upwardly. Furthermore the drive shaft can remain coupled in each position, it doesn't matter whether the mower is perpendicular to the tractor and pulled upwardly or is axially positioned behind the tractor and pulled upwardly. Still further, the mower can be stopped in any selectable inbetween position between work position and transport position and also a very steep and upwardly inclined slope may be mowed.

A further advantage is provided, that the tractor and attached mower can be carried in a truck with the mower remaining in its upwardly pulled position alongside the tractor. In this position it is also possible to provide an upwardly positioned mowing apparatus stop, in which the attached vehicle width is not exceeded so that the tractor with the upwardly stowed mowing apparatus can be moved in a truck. By provision of an open hydraulic operating pipe, the mower when in its working position with the carrying beam part outwardly extended can be moved over a small angle in order to better follow the terrain.

By the arrangement of the carrying sleeve under the carrying beam, the stability is increased while the carrying beam part is in its working position.

Brief Description of the Drawings

Hereinafter the invention is discussed in more detail with reference to the drawings in which a preferred embodiment is set forth. The drawings set forth in.

The Preferred Embodiments

Figure 1:
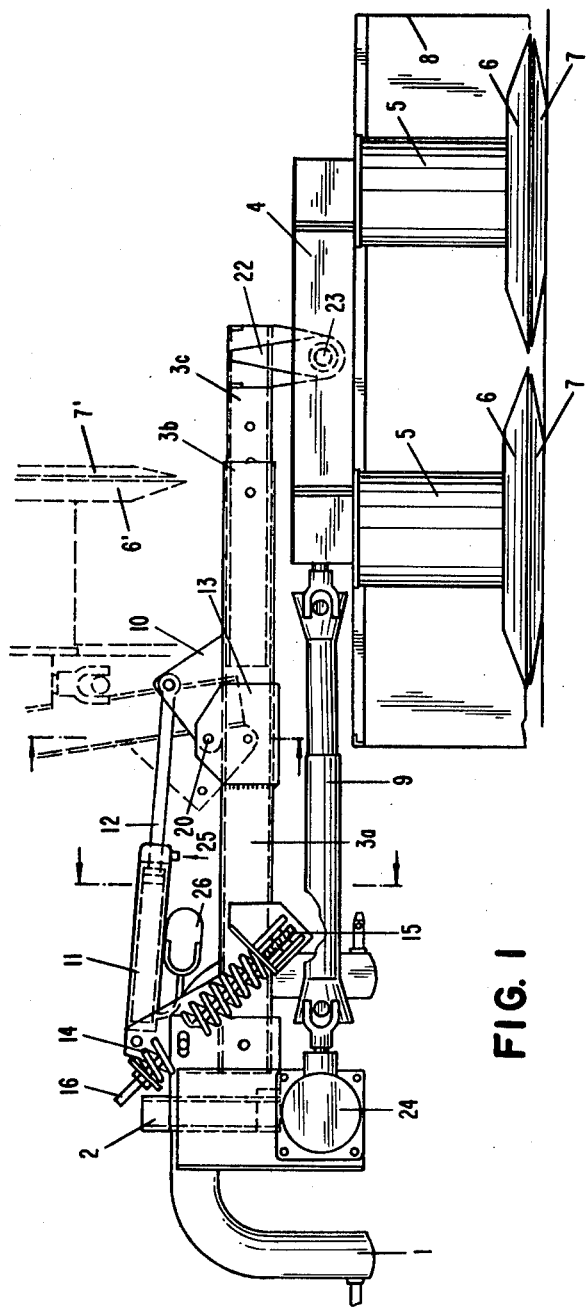
FIG. 1, a side view of the mowing machine of this invention in its working position, FIG. 2, a top view of the machine in working position, FIGS. 3 and 4, detail views, and FIGS. 5 and 6, two different schematic transport positions.

In the Figures the hitching mount of a tractor with a pivotable coupling thereto is designated 1. The carrying beam for the mowing device is in three parts, so that the inner part 3a is coupled on a vertical pivot axis 2, and the outer carrying beam part 3b is affixed to the inner carrying beam part 3a by a carrying sleeve 13 and a horizontal linking rod 20. In the vicinity of the linking rod 20 and perpendicular to the carrying beam part 3b, the flange 10 is fixed, about which the piston 12 of a hydraulic cylinder 11 acts. The other end of the cylinder is coupled to the hitching mount.

A longitudinal part of the carrying beam is shown as 3c, that acts on the outer carrying beam part 3b and there by help of bolts is made adjustable in a selectable position. The longitudinal part 3c carries a downwardly directed carrying sleeve 22 on which a horizontal axle 23 is arranged to hold it on the mower beam 4. The mower beam 4 can swing about the axle 23 in a slight pendulum like action in order to permit better gliding over an uneven height terrain.

In FIG. 1, further a conventional drive axle for the mowing device is shown by 9, of which there are two parts. In this manner a mower drum 5 and a cutting plate 6 having rotating blades are provided as well as a freely turnable gliding plate 7 under a protective cover 8. The driving shaft 9 is in a prior art manner rotated by a drive 24.

Figure 2:
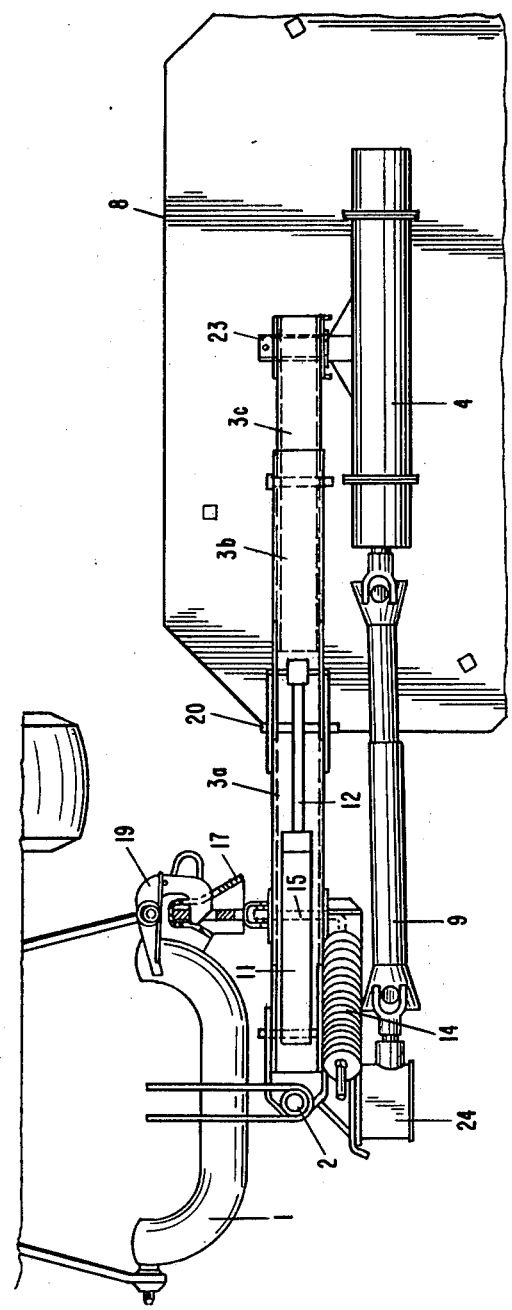
Figure 3:
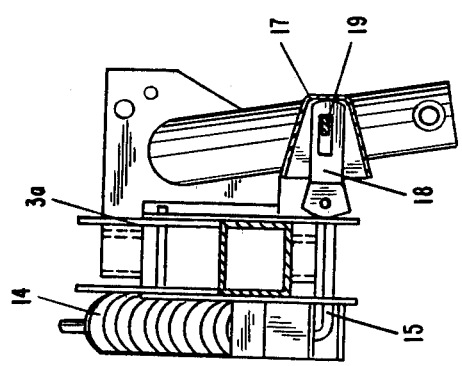

On the carrying beam part 3a there is further a protective latch, which operates under the pressure of a stationary spiral spring 14 and a spring rod 16, which is coupled with a flexible chain 15 to latching pocket 17, which is shown enlarged in FIG. 3. At the end of chain 15 is a movable intermediate link 18 that is locked into the latching pocket 17 by means of a locking clasp 19. With this latching apparatus it is possible that the mower upon encountering a small obstacle will swing a small amount backward and after overcoming the obstacle will return to its original working position, as set forth in FIGS. 1 and 2.

In FIGS. 1 and 2 the machine is shown in its working position. The hydraulic cylinder 11 is connected with the hydraulic system of the tractor by the pipe 25 so that with a flow of oil its pull rod will move. Thereby the carrying beam part 3b with the lengthening piece 3c is pulled upwardly perpendicular along with the mower beam 4 and its included mowing device, as shown in FIG. 1 with the phantom positions 6, 7. In this position, as also seen in FIG. 6 in rear view, the tractor with the raised mower and attached trailer can be moved. Further, it is also possible, to store the machine in each optional intermediate position, so that also very steep slopes may be mowed. A hydraulic tank 26 for the cylinder 11 is shown, so that it is possible by an open pressure piping that a small angle may be achieved between the mower beam on the carrying beam, to equalize any uneven terrains.

Figure 4:
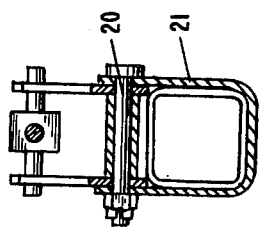

FIG. 4 shows in elevation the horizontal pivot axis 20, in section through the carrying beam, where 21 designates a movement sleeve for the outer carrying beam part which at the same time serves as a stop.

Through the provision of the vertical movement axis 2, somewhat centralized in the hitching mount 1 the upwardly pulled mower can now also be transported directly behind the tractor as is shown schematically in FIG. 5. By this means it is assured that it at no place exceeds the maximum width of the tractor. In each case it is guaranteed that the drive shaft 9 does not become uncoupled, but also at work and in each transport position whatsoever will remain coupled.

We claim:
1. A mower comprising in combination, a mower supporting mount beam carrying at least one mowing device on its underside, a carrying beam having at least two parts, namely an inner carrying beam part and outer carrying beam part in an outer position, a hitching mount for hitching the mower to a transport device, such as a tractor, drive means disposed along the carrying beam coupling the transport device to drive the mowing device, pivot means for swinging the mower between a position behind the transport device and a working position perpendicular thereto coupling the carrying beam about a vertical pivot axis disposed approximately centrally on the hitching mount, means pivoting one carrying beam part and the drive means about a horizontal pivot axis approximately at the center of the carrying beam to move the outer beam part upwardly into an upward position, means mounting the mower supporting beam on the outer carrying beam part to move with its accompanying mower upwardly with the outer carrying beam part about said horizontal axis, and a hydraulic cylinder having a movable piston and connected with the outer part of the carrying beam and mounted to effect its pivot into the upper position for transport behind the transport position when the vertical pivot means for swinging the mower is pivoted to swing it behind the mower and upwardly thereby to produce a center of gravity for the mower close to the transport device without disconnecting the drive means.

2. A mower as set forth in claim 1 further comprising a carrying sleeve surrounding the carrying beam at approximately its center and extending upwardly to define the horizontal axis about which the outer part of the carrying beam pivots.

3. A mower according to claim 2 further comprising mounting means coupling the movable piston by means of a coupling device extending upwardly from the outer carrying beam part positioned near the horizontal pivot axis and pivoted about said horizontal axis in the carrying sleeve.

* * * * *